Oct. 13, 1936. C. T. WALTER 2,057,460
APPARATUS FOR THE TREATMENT OF MEAT
Original Filed April 1, 1932 2 Sheets-Sheet 2
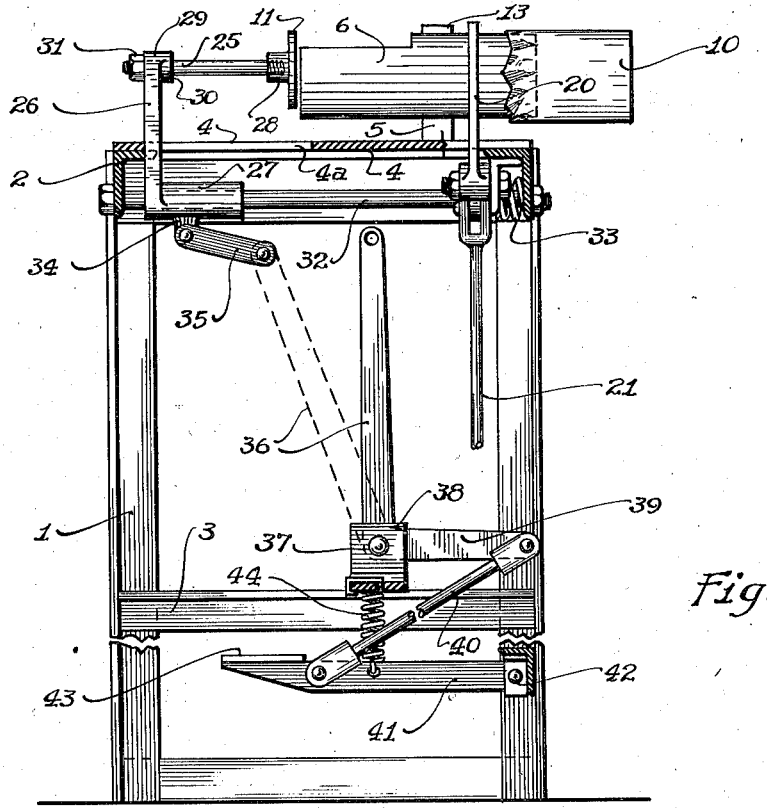
*Fig. 3*
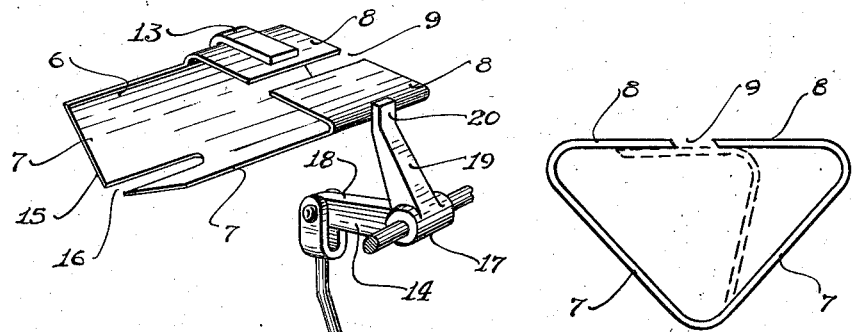
*Fig. 4*
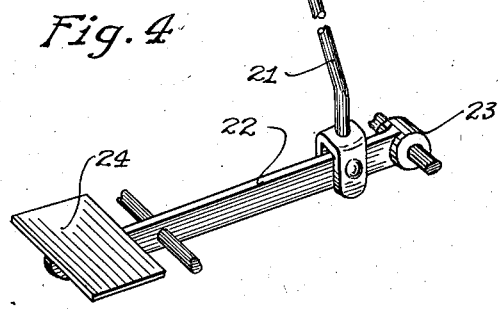
*Fig. 5*
Charles T. Walter
INVENTOR
BY 
ATTORNEY
WITNESS Patented Oct. 13, 1936

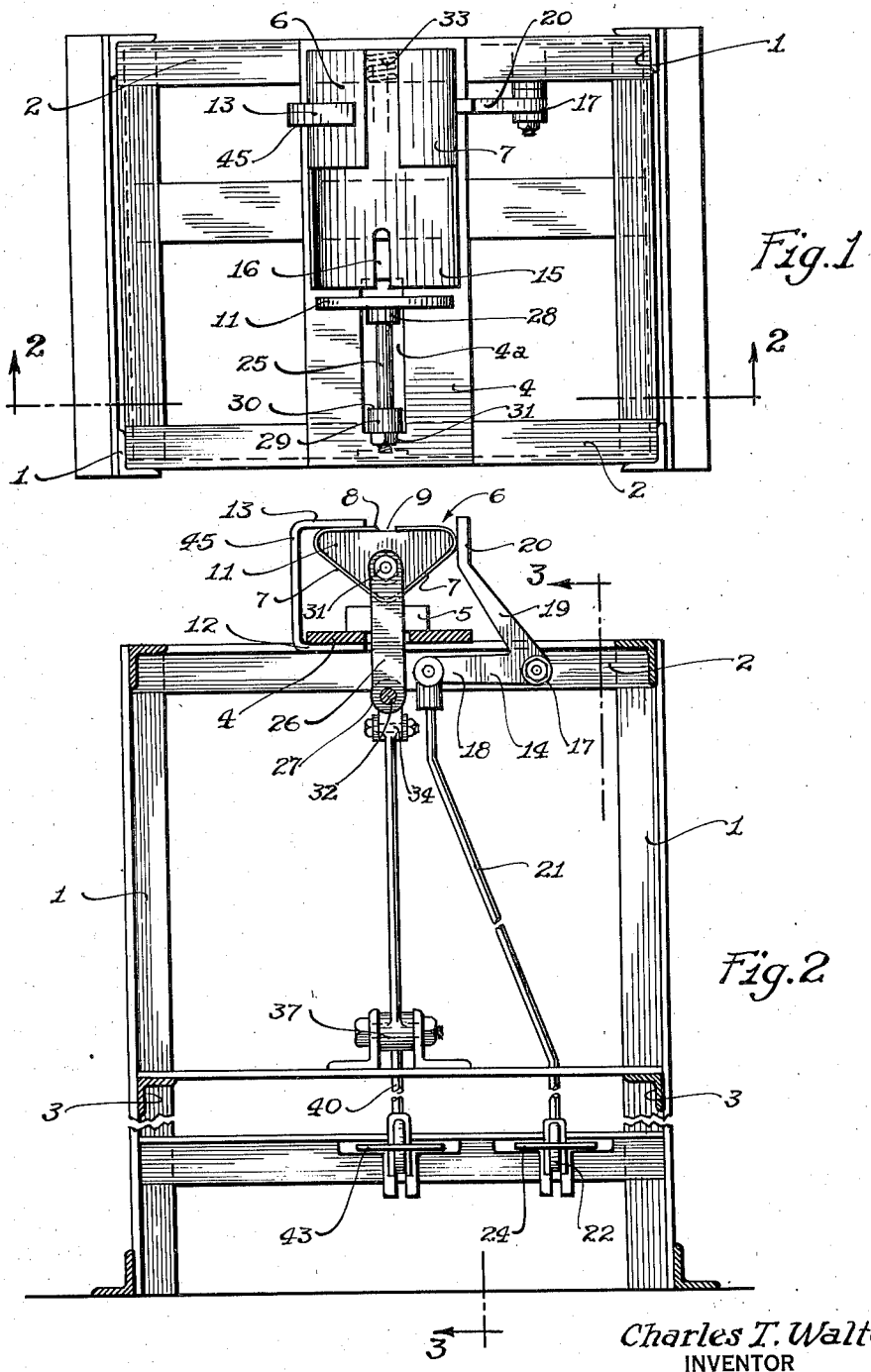

2,057,460

UNITED STATES PATENT OFFICE 2,057,460

APPARATUS FOR THE TREATMENT OF MEAT

Charles T. Walter, Chicago, Ill., assignor, by mesne assignments, to Industrial Patents Corporation, Chicago, Ill., a corporation of Delaware Original application April 1, 1932, Serial No. 602,452. Divided and this application January 9, 1933, Serial No. 650,866

10 Claims. (Cl. 226—18)

This invention relates to an apparatus for treating meat, especially packaged sausage meat specialties and other products.

This application is a division of my application entitled Treatment of meat, filed April 1, 1932, Serial No. 602,452 which issued as Patent No. 1,986,868, dated January 8, 1935.

One of the objects of the present invention is to provide a simple, practical and efficient apparatus of strong, durable and comparatively inexpensive construction, adapted to insert a piece of sausage meat or other product of the desired cross-sectional shape and weight in a tubular flexible artificial casing and capable of producing a package of sausage meat specialty or other product, in which the elastic properties of both the casing material and the meat product will be utilized in maintaining a close tight contact between the product and the artificial casing.

A further object of the invention is to provide a meat packaging apparatus of this character which will enable meat sausage specialties and other meat and dairy products to be rapidly packaged in a completely sanitary manner without the hands of the operator coming in contact with the product during the operation of inserting the same in the tubular artificial casing.

Another object of the invention is to provide a packaging apparatus in which the packages may be prepared either with or without the use of wax paper or other suitable support between the ends of the product and the casing and which will enable the product to be inserted in the casing either as a single piece or in sliced formation.

With these and other objects in view, the invention consists in the construction and novel combination and arrangement of parts hereinafter fully described and illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:—

Figure 1 is a plan view of a sausage meat specialty packaging apparatus constructed in accordance with this invention.

Fig. 2 is a sectional view taken on line 2—2 of Fig. 1.

Fig. 3 is a vertical sectional view taken substantially on the line 3—3 of Fig. 2.

Fig. 4 is a detail perspective view of the flexible nozzle.

Fig. 5 is an end elevation of the flexible nozzle showing the same in normal position in full lines and collapsed in dotted lines.

In the accompanying drawings in which is illustrated one embodiment of the invention, the packaging apparatus comprises in its construction a supporting frame comprising vertical corner posts 1 of angle iron or other suitable material and upper and lower horizontal connecting frame members 2 and 3, but any other suitable form of supporting frame may, of course, be employed.

The supporting frame is provided at its top with a central oblong platform 4 extending from the front to the back of the frame, as clearly illustrated in Fig. 1 of the drawings, and provided at its rear portion with a block 5. The block 5 which is disposed transversely of the platform 4 supports a flexible nozzle 6 constructed of resilient sheet metal or other suitable material and composed of inclined upwardly diverging side walls 7 and horizontal top wall sections 8 extending inwardly from the side walls at the tops thereof and spaced apart at the center of the top of the flexible nozzle to provide an intervening space 9 which permits the flexible nozzle to be compressed and collapsed, as illustrated in dotted lines in Fig. 5 of the drawings. This will enable a flexible tubular artificial casing 10 to be placed on the rear end of the nozzle in a position to have a piece of sausage meat specialty or other product inserted in it by means of a plunger 11, as hereinafter fully explained. The flexible casing receiving nozzle is substantially triangular in cross section with rounded corners and one side of the nozzle is secured to a bracket 45 approximately U-shaped and composed of upper and lower arms and a vertical connecting portion, the lower arm 12 being secured to the lower face of the platform and the upper arm 13 being extended over and secured to the adjacent top wall section or portion 8 of the flexible nozzle. The bracket 45 supports one side of the flexible nozzle while the other side is being operated on by a nozzle collapsing lever 14.

The nozzle which is disposed in the horizontal position above and centrally of the rear portion of the platform 4 is provided at the front with side wall extensions 15 forming an open upper portion and diverging upwardly and spaced apart at their lower edges to provide an intervening space 16 to permit the passage of the plunger mechanism, as hereinafter fully explained.

The nozzle collapsing lever 14 consists of an angle lever fulcrumed at its angle at 17 on the main frame as having a lower approximately horizontal arm 18 and an upper inclined arm 19 provided at the top with an approximately vertical nozzle engaging extension 20 located opposite the arm 13 of the bracket and bearing against the adjacent side of the flexible nozzle and adapted to be moved inwardly with respect to the nozzle to collapse the same from the normal full line position illustrated in Fig. 5 of the drawings to the dotted line position shown therein. When the collapsible nozzle is collapsed, as illustrated in dotted lines in Fig. 5, a piece of tubular flexible artificial casing may be readily fitted on the rear end of the nozzle and when the nozzle is released and permitted to expand through its resiliency to its normal position, the tubular flexible casing will be stretched and placed under tension and will assume the triangular form of the flexible nozzle and be arranged in proper position to have a piece of triangular shaped meat sausage specialty or other product inserted in it for packaging the said product.

The lower arm 18 of the collapsing lever 14 is connected by a link 21 with a treadle lever 22 located at the lower portion of the main frame and extending from the front portion thereof to the back of the same. The treadle lever is fulcrumed at 23 on the main frame and is provided at the front end with a treadle 24 arranged in convenient position to be depressed by the foot of the operator. The front of the frame is open at the bottom to permit free access to the treadle lever. Any other suitable means, however, may, of course, be employed for collapsing the flexible nozzle.

The plunger 11, which is moved longitudinally of the flexible nozzle to force a piece of meat sausage specialty or other product into the flexible casing, is mounted on the inner end of a horizontal plunger rod 25 which is secured at its outer end to the upper end of a vertical arm 26 of a horizontal slide 27. The inner end of the plunger rod is preferably threaded into a boss or enlargement 28 of the plunger 11 and the outer end of the said plunger rod 25 is extended through an eye 29 of the upper end of the arm 26. The portion of the plunger rod which is inserted in the eye 29 is reduced to form a shoulder 30 for engaging the inner end of the eye 29 and is threaded to receive a nut 31 which engages the eye 29 at the outer end thereof. Any other suitable means may, of course, be employed for connecting the plunger with the slide, and the platform 4 is provided with an opening 4ᵃ through which the said arm 26 of the slide passes.

The slide 27 is tubular and is mounted on a horizontal guide rod 32 located centrally beneath the platform 4 and suitably secured at its ends to the supporting frame at the front and back thereof. The slide is adapted to move longitudinally of the guide rod to carry the plunger from the front end of the open hopper portion of the flexible nozzle to the rear end of the said flexible nozzle for forcing the meat or other product from the said nozzle into the casing and in the rearward movement of the slide 27 and the plunger 11 the vertical arm of the slide moves in the opening in the bottom of the hopper portion of the flexible nozzle. A coiled spring 33 is preferably disposed on the guide rod 32 at the rear end thereof to form a cushion for the slide which is adapted to be rapidly actuated in the operation of the apparatus.

The slide 27 is provided at the bottom with a depending lug 34 which is connected by a link 35 with an upwardly extending arm 36 of a bell crank lever 37 fulcrumed at its angle 38 on the supporting frame and provided with a lower rearwardly extending arm 39 which is connected by a link 40 with a treadle lever 41. The upwardly extending arm 36 of the bell crank lever is relatively long and the rearwardly extending arm is relatively short, as clearly illustrated in Fig. 3 of the drawings. The link 40 extends downwardly and forwardly from the rear end of the short arm 39 of the bell crank lever to the front portion of the treadle lever 41. The treadle lever which is fulcrumed at its rear end at 42 on the main frame is provided at its front end with a treadle 43 adapted to be depressed by the foot of the operator.

The treadle lever 41 is connected between its ends with the lower end of the coiled spring 44 extending upwardly from the lever 41 and suitably connected at its upper end with a fixed portion of the frame. The spring 44 is distended when the treadle lever 41 is depressed and it is adapted to return the treadle lever to its normal horizontal position when relieved of the pressure of the foot of the operator.

The raw sausage meat is placed in suitable forms of the desired cross-sectional shape and is cooked sufficiently to bring about coagulation. This coagulated material is then cut into pieces of the desired weight. These pieces are then placed one at a time in the open hopper-like extension of the flexible nozzle after a tubular flexible artificial casing has been placed on the rear end of the said flexible nozzle. The treadle 24 is depressed by the operator to collapse the flexible nozzle which will enable a piece of tubular flexible casing to be readily placed on the rear end of the nozzle. Pressure is then removed from the treadle 24 to permit the nozzle to expand and stretch the casing.

When a piece of the sausage meat, which may be formed of a single piece, or in slices, is placed in the open upper portion of the nozzle, the treadle 43 is depressed to operate the plunger which will force the sausage meat through the nozzle and into the casing. Experiments have indicated that the tubular artificial casing is stretched to approximately 20% and when the meat product is inserted in the casing and the casing removed from the flexible nozzle, the casing which is tensioned by such stretching will tend to compress the meat product and both the elastic properties of the meat product and the material of the flexible tubular casing will cooperate to maintain a constant firm contact between the casing and the meat product. Artificial synthetic casings possess this resiliency and are adapted to be stretched in this manner by the flexible nozzle.

It has been found in practice that it is not necessary to stretch to a definite shape the entire length of the casing by means of the nozzle element 8. It is necessary only to stretch and shape a sufficient portion of the casing at one end to provide an opening of proper shape and size to accommodate the portion of meat to be inserted.

What is claimed is:

1. An apparatus of the class described, including a nozzle of resilient material composed of upwardly diverging side walls and wall sections extending inwardly from the side walls at the top of the same and spaced apart to permit the nozzle to be compressed and collapsed laterally, supporting means connected with one side of the nozzle, and mechanism located at the other side of the nozzle and provided with means for forcing such side inwardly to collapse the nozzle to permit a collapsible tubular casing to be placed on and be distended and shaped by the said nozzle to receive a piece of product of substantially triangular shape cross sectionally.

2. An apparatus of the class described, including a nozzle of resilient material composed of upwardly diverging side walls and wall sections extending inwardly from the side walls at the top of the same and spaced apart to permit the nozzle to be compressed and collapsed laterally, a supporting bracket having a portion rigidly connected to the said nozzle at one side thereof, and mechanism located at the other side of the nozzle for collapsing the same, said mechanism including a lever having an arm arranged to cooperate with the said bracket to compress and collapse the nozzle laterally to permit a flexible tubular casing to be placed on and shaped by the said nozzle.

3. An apparatus of the class described, including a nozzle of resilient material composed of upwardly diverging side walls and wall sections extending inwardly from the side walls at the top of the same and spaced apart to permit the nozzle to be compressed and collapsed laterally, a supporting bracket having a portion rigidly connected to the said nozzle at one side thereof, and mechanism located at the other side of the nozzle for collapsing the same, said mechanism including an angle lever fulcrumed at its angle and having one arm arranged to engage the flexible nozzle to compress and collapse the same laterally, a treadle, and connections between the treadle and the other arm of the angle lever for operating the latter.

4. An apparatus of the class described, including a laterally collapsible nozzle of resilient material, means for compressing and collapsing the nozzle to permit a tubular flexible casing to be placed on the nozzle and to be distended and shaped by the same to receive a piece of product of a predetermined shape, a plunger arranged to force the product through the nozzle and into the casing, a slide connected with and carrying the plunger, a bell crank lever fulcrumed at its angle and having one arm connected with the slide, and a treadle connected with the other arm of the said lever for actuating the slide.

5. An apparatus of the class described, including a horizontal collapsible nozzle of resilient material, means for compressing the nozzle laterally to permit a flexible tubular casing to be placed thereon and to be distended by the said nozzle, a plunger arranged to force a piece of predetermined product through the nozzle and into the casing, a slide connected with and carrying the plunger, a horizontal guide for the slide, a lever connected with the slide for actuating the same, and a foot treadle connected with and adapted to swing the said lever.

6. A nozzle of resilient material provided with collapsible walls and an open extension forming a hopper portion integral with and communicating with the body of said nozzle, and means for collapsing said walls inwardly.

7. In combination, a nozzle of resilient material provided with collapsible walls and an open extension forming a hopper portion integral with and communicating with the body of said nozzle, means for collapsing said walls inwardly and a plunger slideably operable over said hopper and through said nozzle.

8. A nozzle of resilient material provided with walls and means for collapsing said walls by urging said walls inwardly.

9. A nozzle formed of resilient material folded in an angular shape, one wall thereof having a longitudinal slit, said nozzle being supported fixedly, and a finger positioned exteriorly of said wall and adapted to contact one side of said nozzle whereby to force said wall inwardly against the opposition of the resilient walls to reduce the size of the cross section of said nozzle.

10. A nozzle formed of resilient material folded in an angular shape, one wall thereof having a longitudinal slit, said nozzle being supported fixedly, and a finger positioned exteriorly of said wall and adapted to contact one side of said nozzle whereby to force said wall inwardly against the opposition of the resilient walls to reduce the size of the cross section of said nozzle, the resiliency of said walls being such as to spring the walls to a normal position whereby the nozzle will have its greatest cross sectional area when not restricted by the operation of said finger.

CHARLES T. WALTER.